United States Patent [19]

Georgii

[11] Patent Number: 4,673,453

[45] Date of Patent: Jun. 16, 1987

[54] METHOD OF MAKING A STRUCTURAL BODY

[75] Inventor: Hans C. Georgii, Stockholm, Sweden

[73] Assignee: AB Hydro Betong, Stockholm, Sweden

[21] Appl. No.: 606,297

[22] Filed: May 2, 1984

[30] Foreign Application Priority Data

May 4, 1983 [SE] Sweden ................................ 8302555

[51] Int. Cl.⁴ ............................................. B32B 31/18
[52] U.S. Cl. ..................................... 156/256; 156/258; 156/264; 156/272.8; 156/304.1; 156/304.5; 219/121 LG; 219/121 LN; 219/121 LS; 219/121 LU; 219/121 LY
[58] Field of Search ............ 156/256, 258, 264, 272.8, 156/304.1, 304.5; 219/121 LG, 121 LN, 121 LP, 121 LU, 121 LY, 121 LS

[56] References Cited

U.S. PATENT DOCUMENTS

| | | | |
|---|---|---|---|
| 2,751,946 | 6/1956 | Gramelspacher | 156/264 |
| 3,582,466 | 6/1971 | Quirk | 219/121 LG |
| 3,730,797 | 5/1973 | Jensen | 156/264 |
| 3,736,402 | 5/1973 | Mefferd et al. | 219/121 LG |
| 3,740,524 | 6/1973 | Dahlberg et al. | 219/121 LS |
| 3,989,778 | 11/1976 | Osborne | 156/272.8 |
| 4,139,409 | 2/1979 | Macken et al. | 156/272.8 |
| 4,273,398 | 6/1981 | Summers et al. | 219/121 LG |
| 4,338,508 | 7/1982 | Jones et al. | 219/121 LS |
| 4,469,930 | 9/1984 | Takahashi | 219/121 LG |

FOREIGN PATENT DOCUMENTS

| | | |
|---|---|---|
| 009692 | 5/1983 | European Pat. Off. . |
| 2743544 | 3/1979 | Fed. Rep. of Germany ...... 219/121 LN |
| WO80/00014 | 10/1980 | PCT Int'l Appl. . |
| 313181 | of 1969 | Sweden . |
| 745298 | 2/1956 | United Kingdom . |
| 825171 | 12/1959 | United Kingdom . |
| 1091472 | 11/1967 | United Kingdom . |
| 1156008 | 6/1969 | United Kingdom . |
| 1519626 | 8/1978 | United Kingdom . |
| 2048174 | 12/1980 | United Kingdom . |
| 2108546 | 5/1983 | United Kingdom . |

*Primary Examiner*—Caleb Weston
*Attorney, Agent, or Firm*—Browdy and Neimark

[57] ABSTRACT

A structural body is composed of a number of sections which are placed on one another and joined together. According to the invention, the sections, which consist of urethane foam or like plastic material, are provided, at least on one side and preferably on both sides, with a thin metal sheeting, and that the various sections are so shaped that their joining faces are congruent.

The superposed sections, the joining faces of which are congruent, are cut out of sheets by means of a preferably computer-controlled laser.

7 Claims, 4 Drawing Figures

METHOD OF MAKING A STRUCTURAL BODY

The present invention relates to a structural body, especially a body of complicated shape, which is particularly intended to form a whole or part of a load bearing construction and is composed of a number of sections which are placed on one another and joined. Characteristic of the invention is that the sections, which consist of urethane foam or like plastic material, are provided, at least on one side and preferably on both sides, with a thin metal sheeting, and that the various sections are so shaped that their joining faces are congruent.

The invention also relates to a method of making a structural body which is specifically intended to form a whole or part of a bearing construction and is composed of a number of sections which are placed on one another and are joined together, which sections consist of a core urethane foam or like plastic material sandwiched between two layers of thin metal sheeting, and the various sections are shaped so that their joining faces are congruent. The method is characterized in that the superposed sections, the joining faces of which are congruent, are cut out of sheets by means of a preferably computer-controlled laser.

The invention permits making structural bodies of complicated shape at a moderate cost and in a very short time.

The structural body according to the invention may be used within several fields. It may be designed to form a ship hull. It may be designed as any type of model, on a natural or reduced scale, concerning cars, chassis, test models for industry, coulisses. It may be designed for complementary insulation of fronts. Among other fields of use may be mentioned the furniture and interior fittings industry.

The computer receives the specification or elaborates its own specification from the base input. If it is desired, for instance, to design a hull, the input will be the frame ribs, while the computer takes care of the rest. The computer selects sections and cutting angles so that the entire hull can be built up of sections placed directly adjacent each other. At the same time the computer selects the cutting pattern so as to minimize waste.

The sheet material to be cut by laser is adapted to be placed on a cutting table. A laser is mounted above the cutting table with focus in the top surface of the material which consists of a thin sheeting of aluminium or steel. Another laser is mounted below the cutting table with focus laid in the bottom surface of the material which preferably also consists of thin metal sheeting. The laser cuts the material according to instructions given by the computer. A calculated cutting velocity for a suitably dimensioned laser is in the order of some running-metres per minute.

It must of course be possible to have the material cut by the laser equipment at a somewhat moderate power, which delimits the material to thin metal sheets and urethane or the like. A suitable sheet material consists of urethane and metal sheet or a sandwich structure of metal sheet, urethane and metal sheet. By varying the types of metal sheet and, to a certain extent, the thicknesses with the density of the volume material it is possible to obtain large variations in the result and a flexible product. In the normal case the thickness of the metal sheets would be between 0.7 and 1.0 mm.

The invention will be described in more detail below with reference to the accompanying drawings which illustrate the manufacture of a ship hull, where the finished hull constitutes the structural body proper, and in which.

Figure 1:
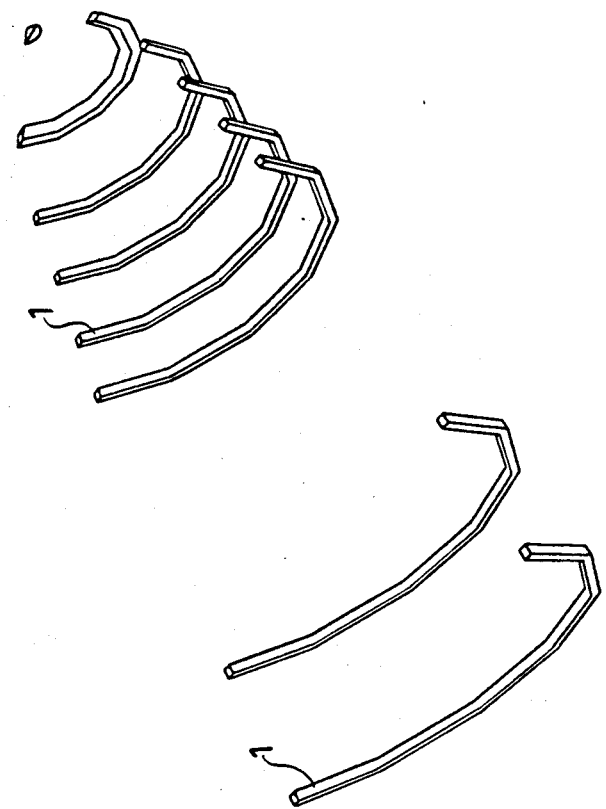
FIG. 1 shows the frame ribs included in the hull.
Figure 1:
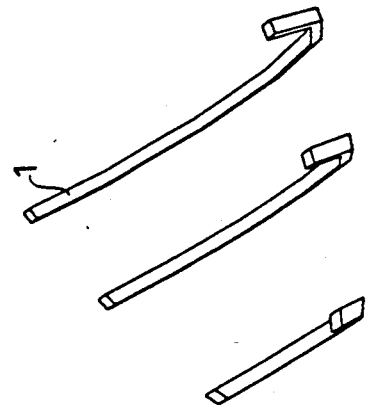
Figure 2:
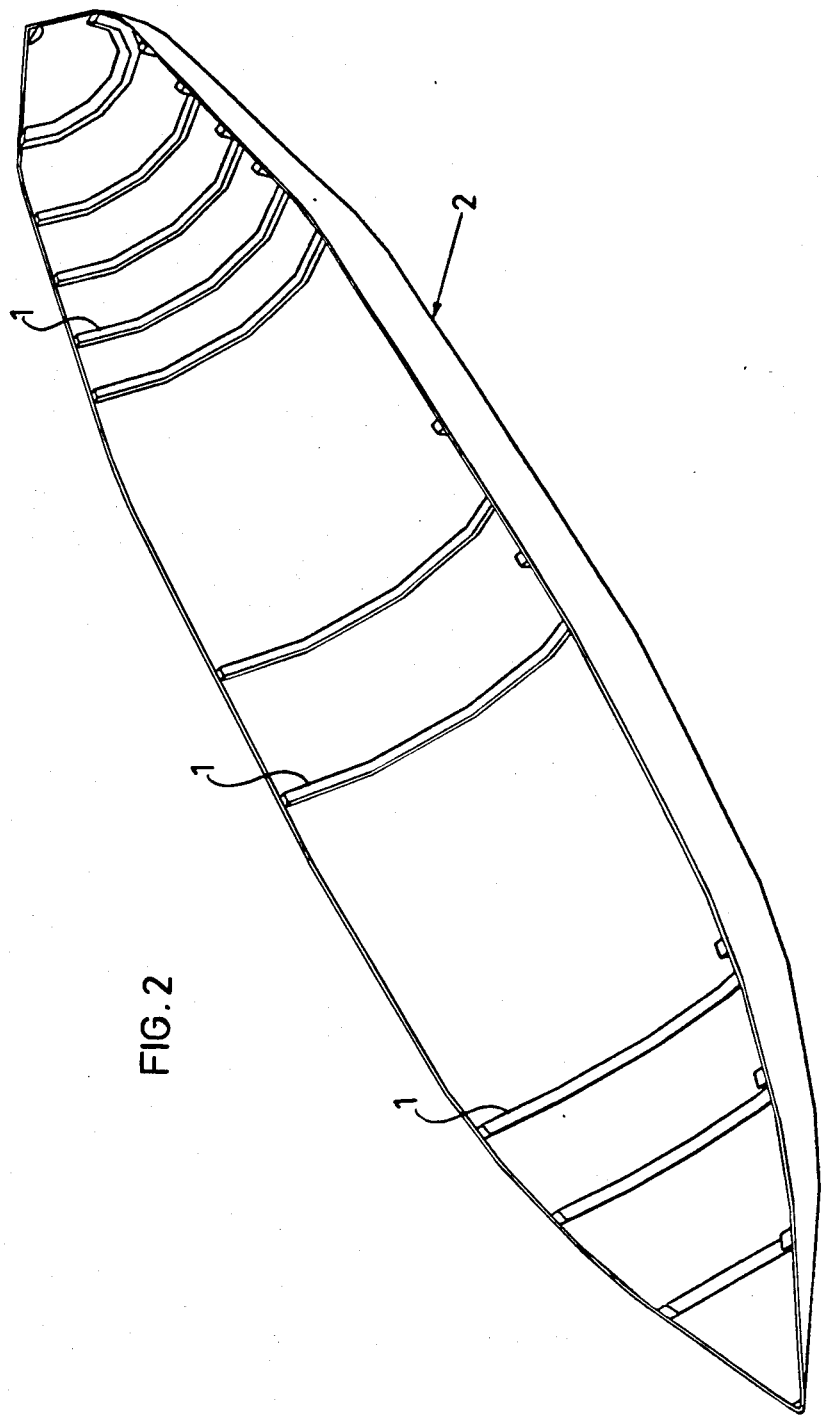
FIG. 2 shows the shape of the hull defined by the frame ribs.
Figure 3:
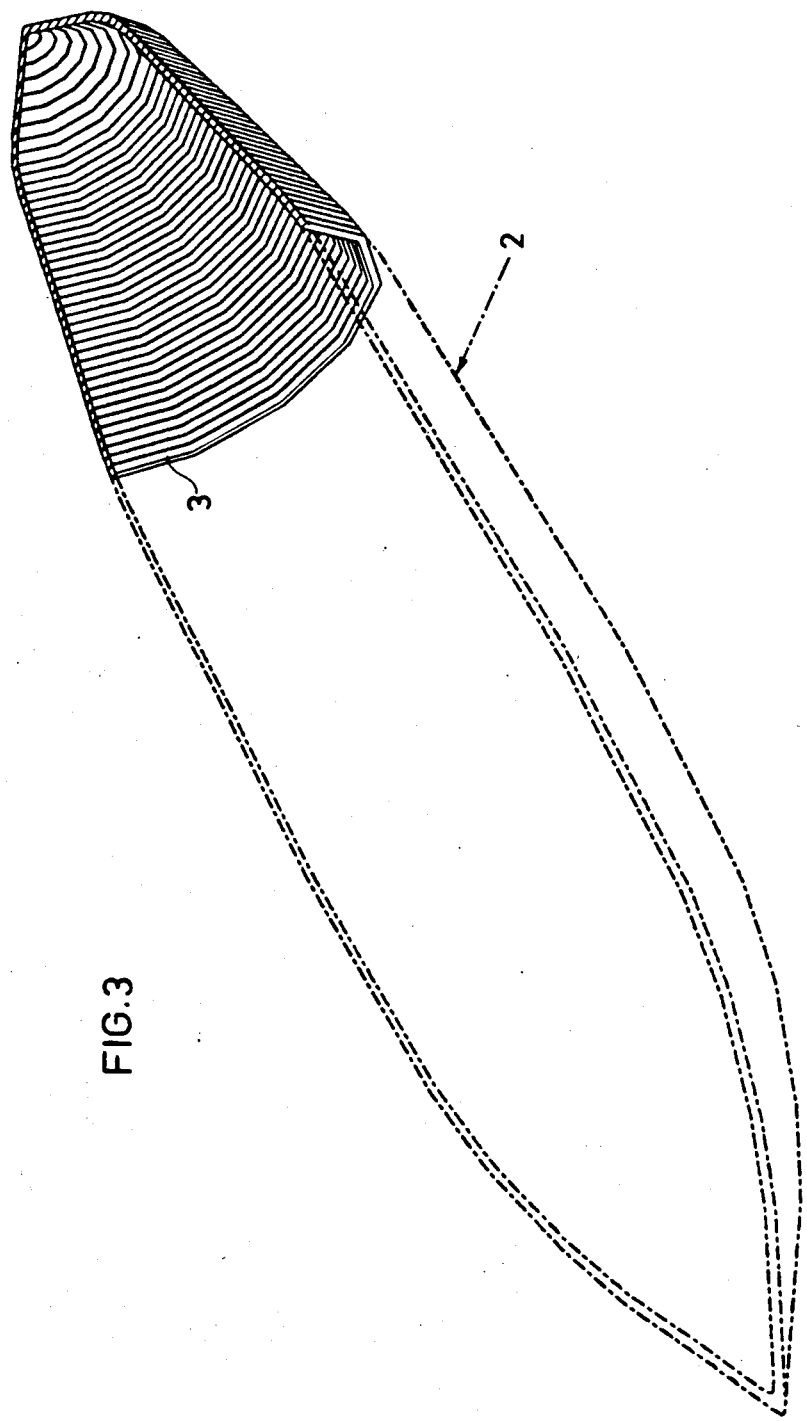
FIG. 3 shows the finished stern part of the hull.
Figure 4:
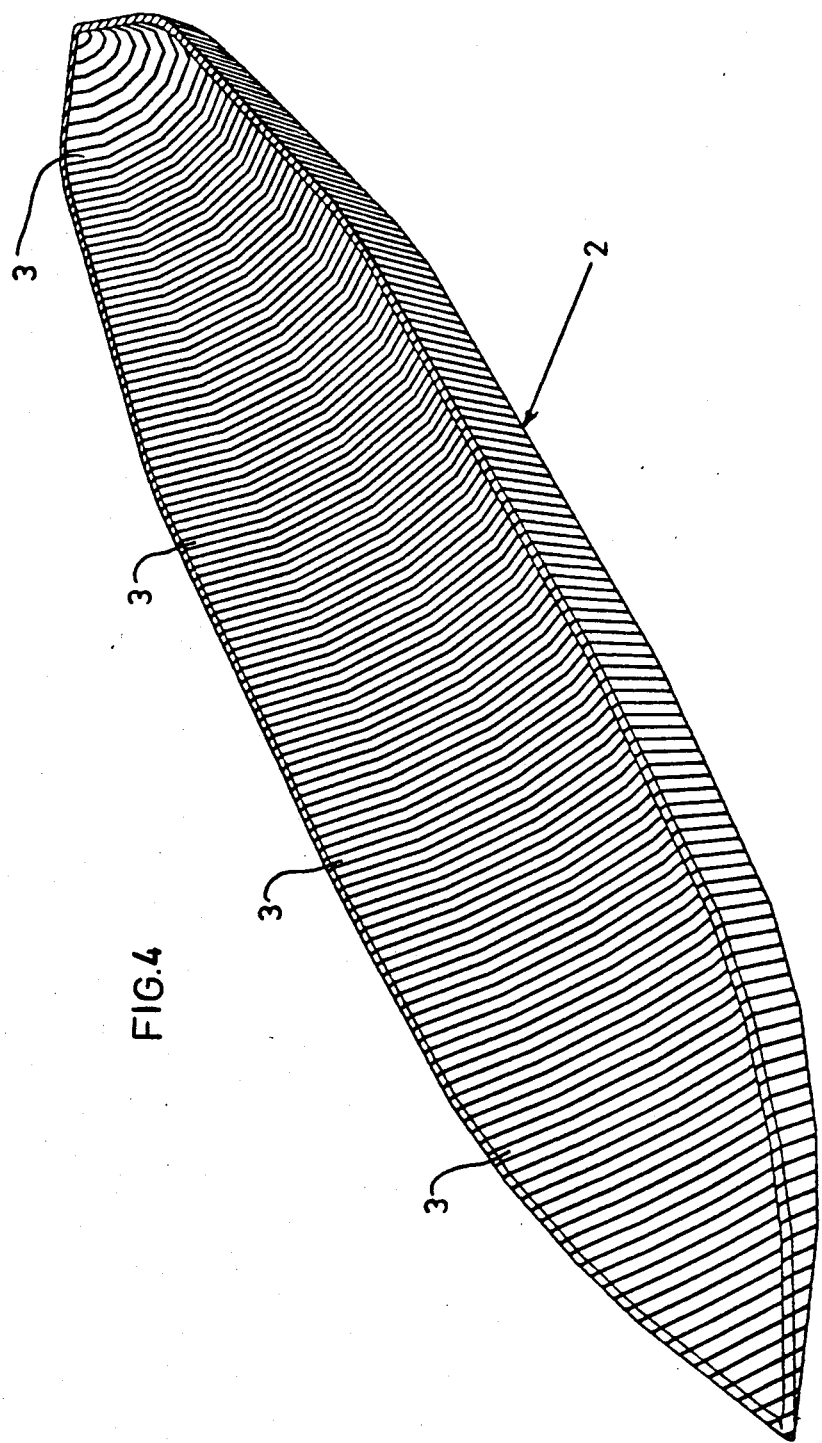
FIG. 4 shows the complete finished hull.

FIG. 1 shows the frame 1 or frame ribs which define the shape of the hull 2 as illustrated in FIG. 2. On the basis of this shape successive adjacent sections 3 are cut out from sheets by means of the computer-controlled laser. The sections 3, which are adapted to be placed adjacent each other and are joined together by means of glue or the like, are formed during cutting so that their joining faces are congruent. FIG. 3 shows the stern of the hull 2 built up of sections 3, while FIG. 4 shows the entire hull 2 built up of sections 3.

The surface of the hull 2 may preferably be coated with adaptable, thin, possibly laser-cut sheets of urethane and metal sheet which are glued with the edges directly applied to each other on the outside of the hull 2. The sheet may be thin aluminium sheet or rustproof sheet which gives mechanical and corrosive strength. The metal sheet will at the same time constitute tensile and compressive means for longitudinal moments. The urethane combined with the metal sheet should be denser than the urethane in the sections 3.

Large hulls 2 will require a longitudinal stability which may be obtained by reinforcing the hull with a longitudinal beam structure or by specifically built tensile and compressive means. It is easy to reserve space in the sections 3 for such stiffening elements. These zones may later be used as fixing points during mounting, i.e. the glueing of the sections 3 to each other.

Instead of placing a metal sheet on the outside of the hull 2, the hull 2 may be surface-coated with a woven glass fabric or the like. If desired both sides of the construction may be coated.

The product may be varied by varying the thickness and density of the urethane layers and the thickness and quality of the metal sheets.

Statically the construction functions as if it were built up of thin metal sheets or shells being brought to coact via the volume material, i.e. the urethane foam, which material also prevents buckling of the thin construction. The buildup of the construction prevents practically entirely shrinkage in the volume material.

A complementary insulation for fronts manufactured in accordance with the invention may have urethane and thin rust-proof metal sheet as starting material. The appearance of the front is fed into the computer which by means of the laser cuts out a suitable pattern for the front while taking into account any delicate connections.

As is already apparent from the above description the structural body of the invention may be used within the most varying fields. Thus it may be formed as an aircraft wing or as an artificial heart. In the latter case it is imperative that the sheet material chosen is such as is acceptable to the human body.

The structural body according to the present invention may also be used as a model for forming a mould in e.g. granolithic concrete. The mould is divided into two halves which are mounted on the frame. The frames are mounted together by hydraulic means so that the mould can be opened and closed. The model proper is made in granolithic concrete directly in the mould.

The granolithic concrete mould can now be used for cold-forming the thin metal surface sheet on both sides of the core, the urethane foam. This is effected with the concrete model in the moulds. When the model is removed the urethane may be foamed in between the cold-formed thin metal sheets.

The method is suitable for short series since the concrete will eventually be damaged in the surface. During the cold-forming of the metal sheets the concrete moulds may be coated with some rubber cloth or the like to obtain a better result.

An advantage with this method is that the surface may be provided with a cold-formed thin metal sheet also in case of complicated surfaces and that the laser cutting is restricted to the model.

The invention is not restricted to that described above and shown in the drawings but may be modified within the scope of the appended claims.

What I claim and desire to secure by Letters Patent is:

1. A method of making a structural body having a complex shape, the steps of which comprise:

providing sheet material comprising a foamed plastic core sandwiched between two layers of thin metal sheeting for providing tensile and compressive strength;

selecting a pattern of laterally joined sections, the whole of said pattern corresponding to said shaped body;

cutting said sheet material into a plurality of shaped sections, each section corresponding to a section of said pattern and some of which differ in configuration from one another, by engaging a first laser on one side of the sheet and a second laser in opposition to said first laser on an opposing side of said sheet, said first and second lasers being controlled by a computer to produce said plurality of shaped sections with planar faces so that said sections can be assembled side-by-side with adjacent faces which are congruent;

joining said plurality of shaped sections together with pairs of congruent faces in side-by-side contact to form a structural laminated body having curved surfaces and a variable cross-section; and providing on at least one surface of said structural laminated body a surface layer to provide increased mechanical strength.

2. A method according to claim 1 wherein said foamed plastic core is urethane foam.

3. A method according to claim 1 wherein said surface layer for said structural laminated body comprises metal which is adhered to said body by glueing.

4. A method according to claim 1 wherein said surface layer is a surface coating comprising woven glass fabric.

5. A method according to claim 1 wherein said thin metal sheeting has a thickness between about 0.7 and 1 mm.

6. A method according to claim 1 wherein said joining of shaped sections is effected by glueing.

7. A method according to claim 5 wherein said joining of shaped sections is effected by glueing.

* * * * *